804X
I. Jennings.
Making Thimbles.
Patented Nov. 20, 1807.
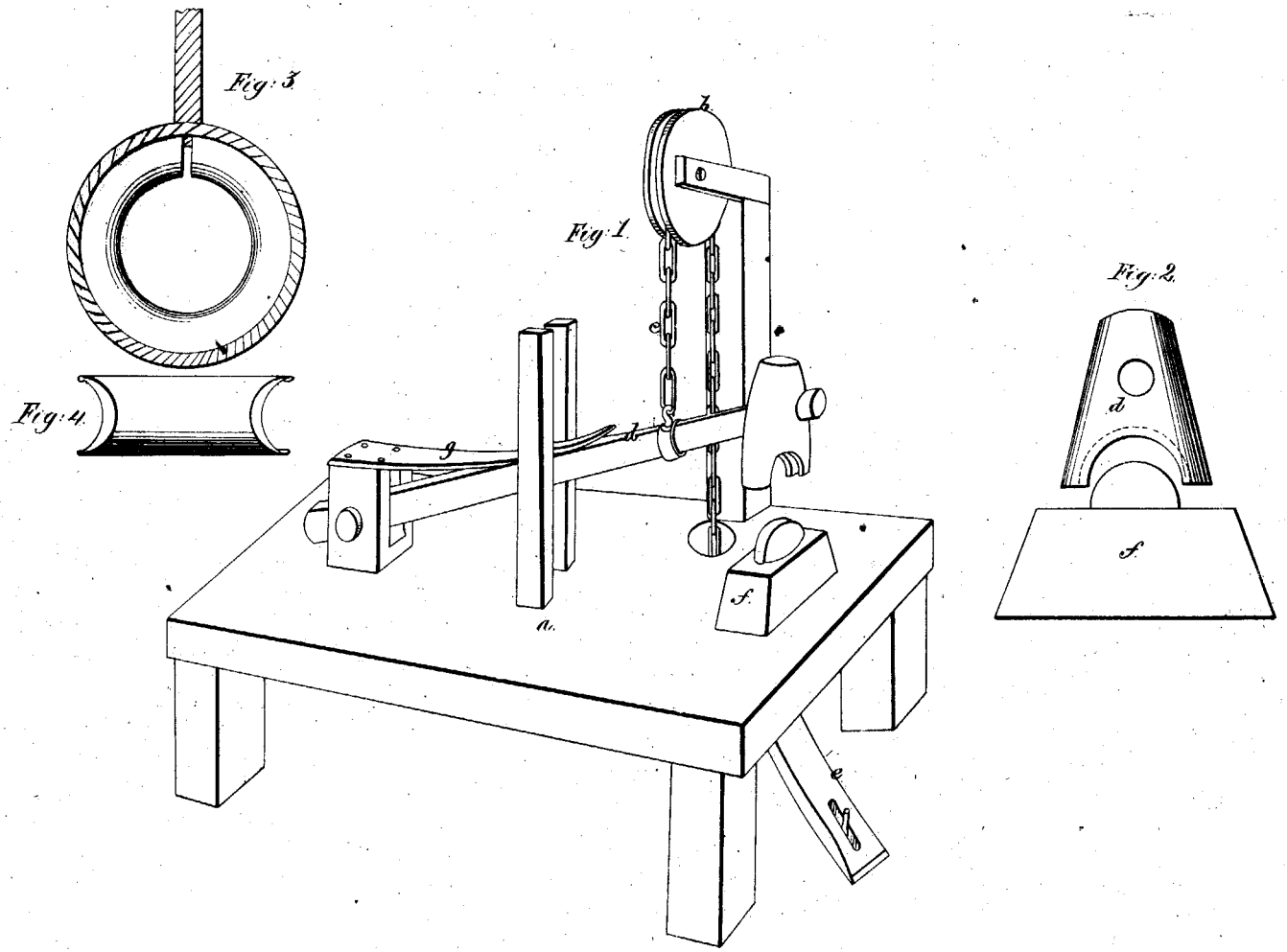
THE GRAPHIC CO. PHOTO-LITH. 39 & 41 PARK PLACE, N.Y.

804X

Isaiah Jennings
Letters Patent

Nov. 20, 1807

Issued Nov. 26. 1807.

The Schedule refer'd to in these Letters Patent and making part of the same containing a description in the words of the said Isaiah Jennings himself of his machine for manufacturing thimbles for the sails of ships & vessels & for all sorts of rigging —

---

This machine is supported by a platform which rests upon four legs. The platform is six feet in length & two in breadth, but it may be varied in these respects. The height from the floor upon which the machine stands is about four feet: tho' the legs may be longer or shorter.

At a convenient point in the platform there is erected a standard perpendicular to its plane; and at a right angle with the standard there is continued an arm. This arm about its middle is firmly supported by a prop. There is a knob at the extremity of the arm, with a perpendicular mortice, it contains a moveable sheave or wheel over which passes a chain or cord connecting the handle of the hammer with the foot piece or treadle — Immediately under the face or striking part of the hammer is fixed a solid kind of anvil (called a stake or backhorn) composed of wrought iron. The hammer itself is connected by a moveable joint with a short standard, and is also connected at its other extremity with the treadle by means of the chain or cord. The weight of its face or striking part is increased to any degree by a mass of iron or other substance with which the hammer is loaded. For common work, this weight amounts to about thirty pounds, but it may be increased or diminished —

It may be here necessary to mention that the thimbles are metallic rings, convex within, and concave without. They are thus constructed for the purpose of having ropes bent & spliced around them that they may thereby aid in preventing the wear & tear of canvas & cordage in sails. The formation of these concave, convex rings in the common way of hammering by hand had been found laborious and difficult. My machine is intended to facilitate this operation & to give these rings or thimbles their proper form by a

804X

[illegible] operation process. To accomplish this end, the face of the hammer is of a circular figure corresponding to the circular figures of the anvil or back horn below: according to the size of the thimble. to form one of these concave convex rings a piece of flat rolled iron is heated in the forge and held by the tongs, between the curved face of the hammer & that of the backhorn. There it is beaten by repeated strokes of the hammer worked by the Treadle until in the course of one revolution as the operator turns it the thimble is firmly welded & fitly shaped. By this method of working, these thimbles, so difficult to manufacture in the old way, may be formed in a workmanlike manner nearly eight times as fast. To keep the hammer steady in its place two guides are erected one on each side, which while they permit the freest motion up & down prevent all deviation from side to side. To aid the operator & quicken the motion of the hammer, there is sufficient spring to act upon the back of the lever. This large spring is backed by another & smaller spring acting upon it. The small spring acts by stiffening the large one, and it may be omitted if the operator pleases. The effect of one or of both of them, & also of the weight, is the same as striking with the common sledge hammer.

Such is my invention & I claim the benefit and application of it to every mode of forming Thimbles by its instrumentality whether the machine be worked by the foot of the operator upon a Treadle, by his hand through a winch by a wheel turned by hand labour, or by any mechanism set in motion by water, or by any other power.

Witnesses
Abm Leggett
Silvenus Waring

Isiah Jennings

Drawing made. March 1840 by [illegible]

Exd
M.G.C.

[illegible] 42 [illegible]